United States Patent
Maciejczyk (10) Patent No.: US 7,320,471 B2
(45) Date of Patent: Jan. 22, 2008

(54) STROLLER SEAT ATTACHMENT

(75) Inventor: Wieslaw Maciejczyk, Victoria (AU)

(73) Assignee: Britax Childcare Pty Ltd, Victoria (AU)

( * ) Notice: Subject to any disclaimer, the term of this patent is extended or adjusted under 35 U.S.C. 154(b) by 0 days.

(21) Appl. No.: 11/427,901

(22) Filed: Jun. 30, 2006

(65) Prior Publication Data
US 2007/0001429 A1 Jan. 4, 2007

(51) Int. Cl.
B62B 3/02 (2006.01)

(52) U.S. Cl. .................. 280/47.38; 280/642; 280/658; 280/47.35; 280/47.41

(58) Field of Classification Search ............. 280/47.38, 280/642, 658, 47.35, 47.41, 638, 639, 38, 280/641, 647, 649, 650, 651, 654, 655, 655.1, 280/47.4, 657

See application file for complete search history.

(56) References Cited

U.S. PATENT DOCUMENTS

| | | | | |
|---|---|---|---|---|
| 5,653,460 A | * | 8/1997 | Fogarty | 280/642 |
| 6,045,145 A | * | 4/2000 | Lan | 280/47.38 |
| 6,378,892 B1 | * | 4/2002 | Hsia | 280/650 |

* cited by examiner

*Primary Examiner*—J. Allen Shriver
(74) *Attorney, Agent, or Firm*—Adams Evans P.A.

(57) ABSTRACT

A mounting arrangement for mounting a toddler seat to a pram or stroller having a framework is disclosed. The mounting arrangement includes a first support element that is pivotably attached to the framework and a second support element connected to the first support element. Also included is a mounting portion to attach the toddler seat. The second support element in a first deployed configuration is attachable to the framework to configure the mounting arrangement for the seating of a toddler and the second support element is further releasable from the framework to allow the mounting arrangement to fold or collapse to a compact folded configuration.

13 Claims, 10 Drawing Sheets

STROLLER SEAT ATTACHMENT

FIELD OF THE INVENTION

The present invention relates to strollers for children. In a particular form the invention relates to providing an additional seating arrangement for a young child or toddler that attaches to the stroller and is foldable with the stroller.

BACKGROUND OF THE INVENTION

The concept of incorporating an additional seating arrangement for a young child with a standard pram or stroller provides the benefit of being able to transport an extra child. Typically a stroller is composed of a chassis formed by a pivotably interconnecting framework typically of steel tubing or the like in which resides a seating arrangement formed from cloth panels which may be easily folded. This framework includes mounting portions for the wheels, typically either three or four, and a handle to push the stroller. Depending on the exact design, the stroller or pram may be folded by releasing catches or latches and folding the pivotably interconnected framework to a folded configuration.

Additional seating arrangements suitable for a young child or toddler seats are designed to provide a secondary seat which may be attached to the framework of the stroller or pram. These arrangements typically also consist of a separate mounting framework and a seat support for the young child. For strollers of the three wheel variety i.e. those incorporating two rear wheels and a front wheel, the toddler seat is typically fixed to the stroller by a pair of front support members which either attach to mounting points on either side of the footrest section or alternatively include a single front support member which abuts the footrest section. A pair of rear support members is then attached to mounting points on each side of the frame at a location further up from the footrest section. In this configuration the front support member or members acts as a stabiliser preventing seat rotation either forwards or backwards.

This mounting arrangement has a number of significant disadvantages. The primary disadvantage is that this arrangement substantially detracts from the ability to fold the stroller into a compact configuration. Whilst the support members for the toddler seat often incorporate hinged elements to aid in the adjustment of the location of the seat, the location of the toddler seat close to the footrest results in the toddler seat adding substantially to the storage room required when the stroller is in the folded configuration. Consequently, the toddler seat is routinely detached from the stroller each time the stroller is folded for storage, for example, for storing in a car. Clearly, this adds to the inconvenience of using the stroller.

Another disadvantage is that whilst the location of the support arrangement for the toddler seat being near to the footrest provides excellent support for the toddler seat, this location substantially impedes the ability of the child occupying the stroller seat from getting into position. Again, this greatly adds to the inconvenience of using the toddler seat, as a parent may have to coax an impatient child to occupy the main stroller seat.

It is an object of the present invention to provide a toddler seat mounting arrangement capable of being folded with the pram or stroller to which the mounting arrangement is attached.

It is a further object of the present invention to provide a toddler seat mounting arrangement capable of being attached to a pram or stroller at a location that does not substantially interfere with the occupant of the stroller.

SUMMARY OF THE INVENTION

In a first aspect the present invention accordingly provides a mounting arrangement for a toddler seat, the mounting arrangement for mounting the toddler seat to a pram or stroller having a framework, the mounting arrangement including.

a first support element pivotably attached to the framework;

a second support element connected to the first support element;

a mounting portion to attach the toddler seat, wherein the second support element in a first deployed configuration is attachable to the framework to configure the mounting arrangement for the seating of a toddler and wherein the second support element is further releasable from the framework to allow the mounting arrangement in use to fold or collapse to a compact folded configuration.

This mounting arrangement allows the toddler seat to be released from the framework of the stroller so that it is able to be folded or collapsed to reduce the storage volume required to store the stroller. This also provides greater flexibility in the position of the mounting arrangement with respect to the stroller so that the comfort of the occupant of the stroller can be more easily accommodated.

Preferably, the second support element is pivotably connected to the first support element.

Preferably, the second support element includes releasable locking means to lock the support element in position with respect to the stroller framework.

Preferably, the releasable locking means allows the second support element to completely detach from the framework.

Preferably, the first support element includes the mounting portion for the toddler seat.

Preferably, the first support element is of a one piece construction pivotably connected to a first location on the framework at one end and extending over a seating portion of the stroller to be pivotably connected at its other end to an opposed second location on the framework, Preferably, the second support element includes first and second opposed leg members each pivotably connected to opposed sides of the first support element and each attachable to the framework at respective locations displaced from the first and second opposed locations on the framework.

Alternatively, the second support element includes the mounting portion.

Alternatively, the second support element is of a one piece construction connected to a first location on the framework at one end and extending over a seating portion of the stroller to be connected at its other end to an opposed second location on the framework.

Preferably, the first support element includes first and second opposed leg members each pivotably connected to the second support element and further pivotably attached to the framework at respective locations displaced from the first and second opposed locations on the framework.

Alternatively, the releasable locking means includes sliding means to allow an end of the second support element to slide along the framework.

Preferably, the framework is of a tubular configuration and the sliding means is a collar to slide along the framework.

In a second aspect the present invention accordingly provides a mounting arrangement for a toddler seat, the mounting arrangement for mounting the toddler seat to a pram or stroller having a framework, the framework including first and second frame elements pivotally connected to allow the stroller to be folded to a compact configuration, the mounting arrangement including:

a first support element pivotably attached to the first frame element;

a second support element pivotably interconnected to the first support element and pivotably connected to the second frame element;

a mounting portion to attach the toddler seat, wherein the second support element includes a hinged portion lockable in a first deployed configuration, the hinged portion configured to allow the mounting arrangement to fold or collapse on folding of the first and second frame element of the stroller to the compact configuration.

BRIEF DESCRIPTION OF THE DRAWINGS

A preferred embodiment of the present invention will be discussed with reference to the accompanying drawings wherein:

FIG. 10b is a detailed exploded view of the latching plate that forms part of the release mechanism illustrated in FIG. 10a.

FIGS. 11a-11e are detailed component views of the locking bracket illustrated in FIG. 10a.

In the following description, like reference characters designate like or corresponding parts throughout the several views of the drawings.

DESCRIPTION OF PREFERRED EMBODIMENT

Figure 1:
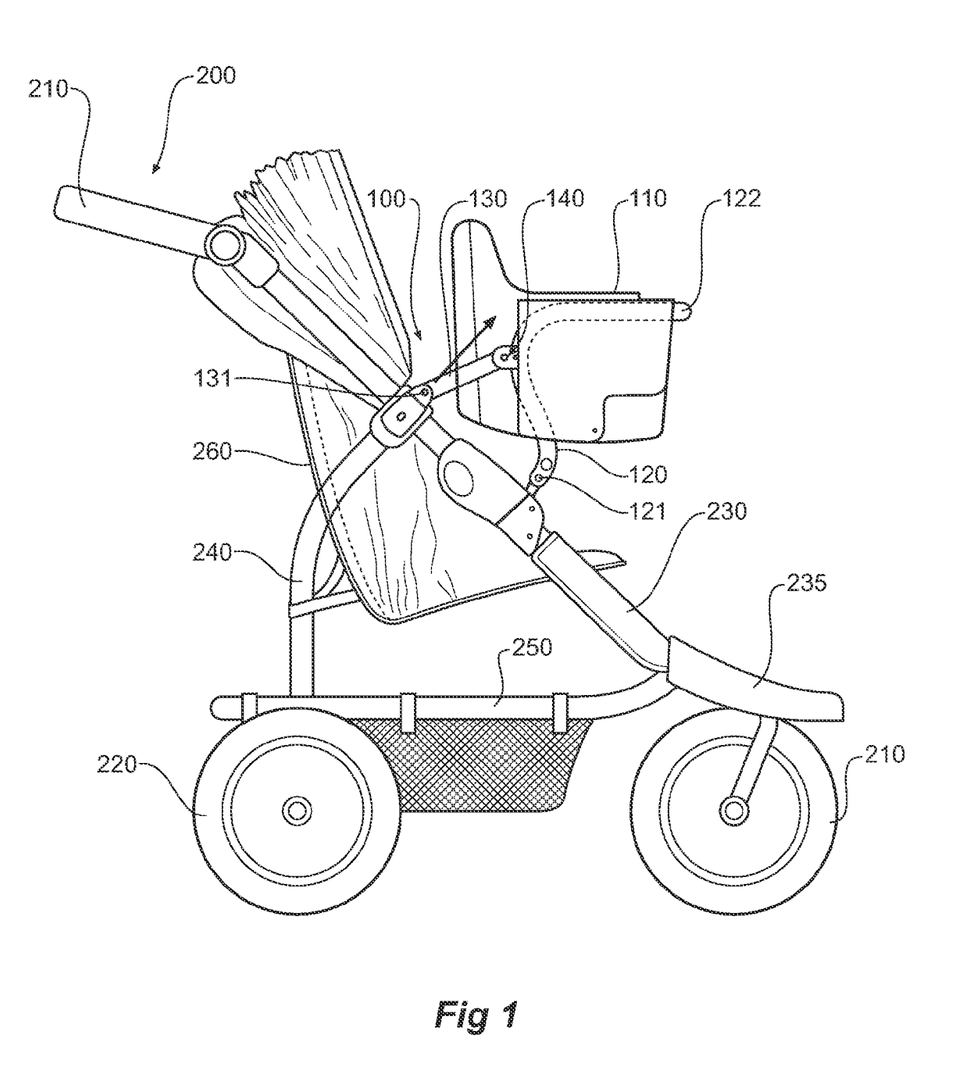
FIG. 1 is a side view of a mounting arrangement for a toddler seat as mounted to a stroller according to a first illustrative embodiment of the present invention.

Referring now to FIG. 1, there is shown a mounting arrangement 100 for a toddler seat 110 according to a first embodiment of the present invention. In this first embodiment, mounting arrangement 100 is mounted or attached to a stroller of the three wheel variety. As would be apparent to those skilled in the art, the present invention may be adapted for attachment to strollers or prams of varying configurations as required.

Stroller 200 is made up of a framework including a pair of inclined sections 230 of tubular steel terminating at a lower end in a footrest 235 and forming at an upper end a handle 210. Footrest 235 includes a mounting site for front wheel 210. Stroller framework also includes a pair of upright sections 240 attached to the inclined sections 230 substantially midway between the locations of the handle 210 and footrest 235.

Extending between the bottom ends of upright sections 240 is an axle (not shown) with a pair of wheels 220 attached at each end. A pair of substantially horizontal stay or bracing sections 250 extend between footrest 235 and the lower portion of respective upright sections 240. The stroller seat 260 is located between and attached to the framework at locations on both the inclined sections 230 and upright sections 240 of the stroller framework. As is known in the art, stroller 200 will include a number of hinge joints to allow the stroller to be folded for easy transport such as in the boot of a car.

Mounting arrangement 100 includes a first support element 120 of one-piece construction attached at each end to respective inclined sections 230 by hinge joints 121 each located near to the base or seat forming portion of stroller seat 260, thereby extending over the seat 260 of stroller 200. First support element 120 includes a mounting portion 122 extending over the stroller seat 260 for the attachment of a toddler seat 110 which is of reinforced fabric construction and includes a number of folded fabric sections to attach toddler seat 110 to mounting portion 122 as is known in the art.

Mounting arrangement 100 also includes a second support element including a pair of opposed leg members 130 each releasably attached at one end by release mechanism 131 to respective inclined sections 230 at a location displaced upwardly from hinge joints 121 at the point where the upright section 240 and the inclined section 230 are attached to each other. Each leg member 130 is then further pivotably attached to a respective side of first support element 120 by hinge joint 140. In this deployed configuration a toddler is seated in toddler seat 110.

Figure 2:
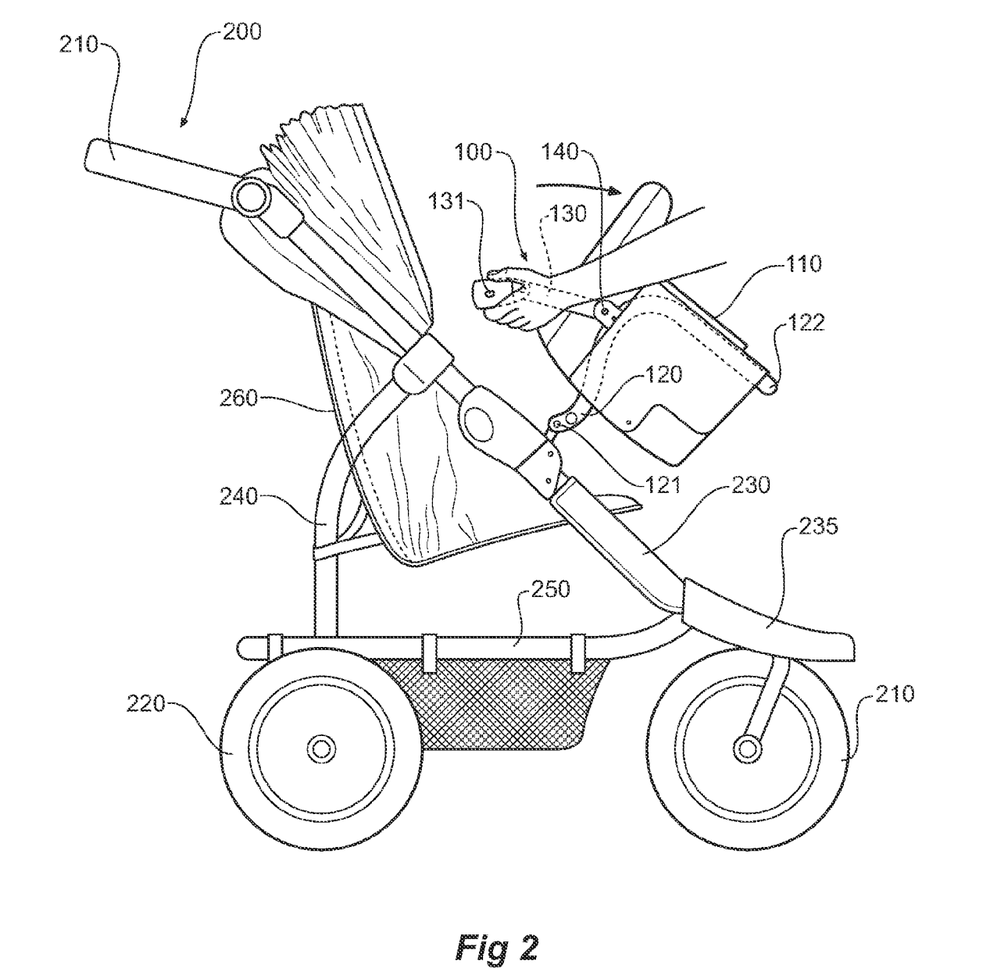
FIG. 2 is a side view of the mounting arrangement illustrated in FIG. 1 detached from the stroller.
Figure 3:
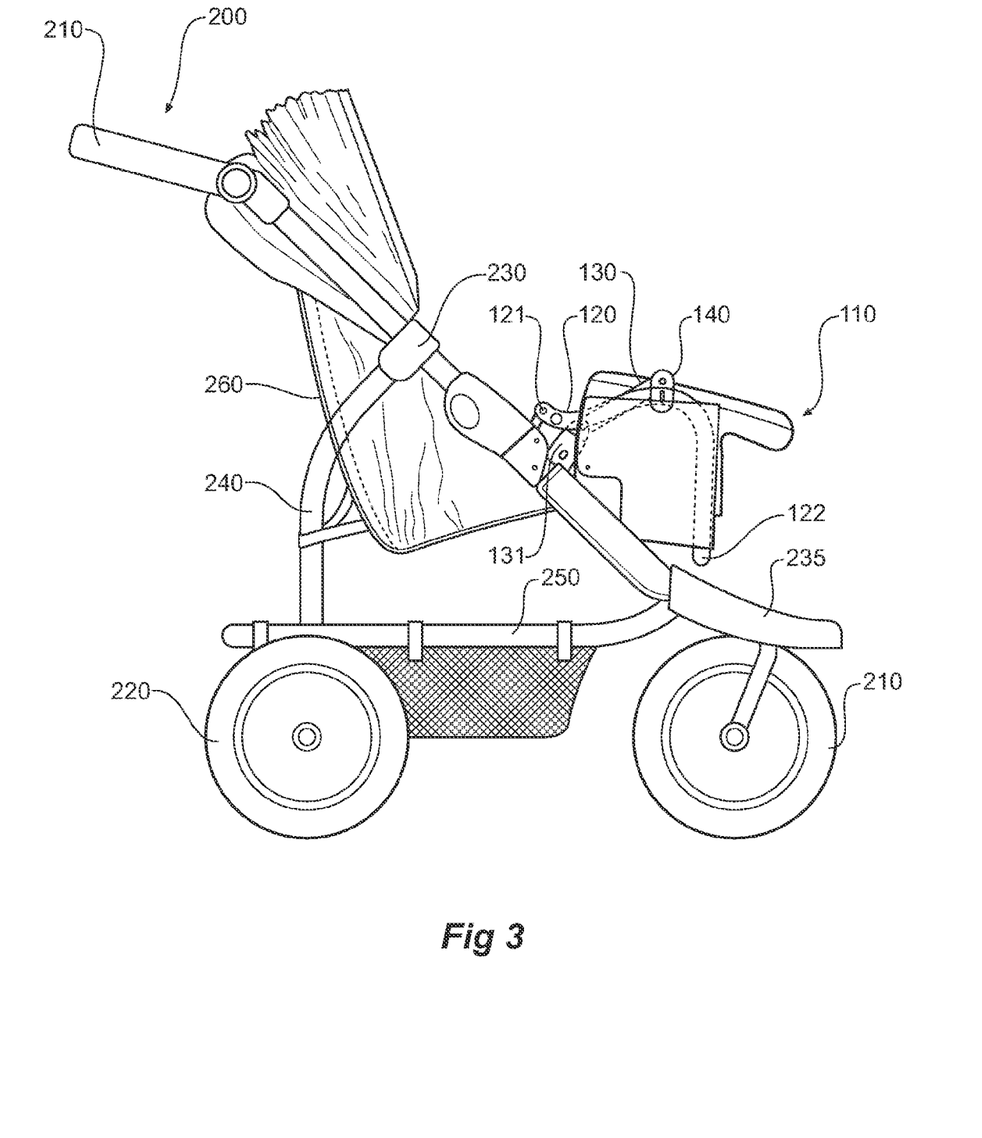
FIG. 3 is a side view of the mounting arrangement illustrated in FIG. 1 in the compact folded position.

Referring now to FIGS. 2 and 3, the process of folding the mounting arrangement 100 to a compact folded configuration is depicted. Leg members 130 are released from the stroller framework by activating releasable locking means or release mechanism 131 to in this embodiment detach each leg member 130 from a respective inclined section 230. As first support element 120 is attached to the inclined frame sections 230 by hinge joints 121 the mounting arrangement 100 can be motioned downwards until the first support element 120 abuts footrest 235. The folding procedure is completed by folding leg members 130 downwards by virtue of hinge joints 140 to be received within first support element 120 thereby resulting in a compact folded configuration.

In use a child is first seated in stroller seat 260 and then mounting arrangement 100 deployed from the compact folded configuration (as best seen in FIG. 3) by attaching leg members 130 to the stroller framework. Then a toddler may be seated in toddler seat 122. In this manner, both children may be easily seated in the stroller in a relatively short time. This process is simply reversed on completion of use of the stroller 200. Mounting arrangement 100 is detached from the stroller framework and folded into the compact folded configuration thereby allowing the stroller 200 to be folded itself for storage. Hinge joint 121 may be further adapted to allow for the complete detachment of mounting arrangement 100 should this be desired.

Figure 4:
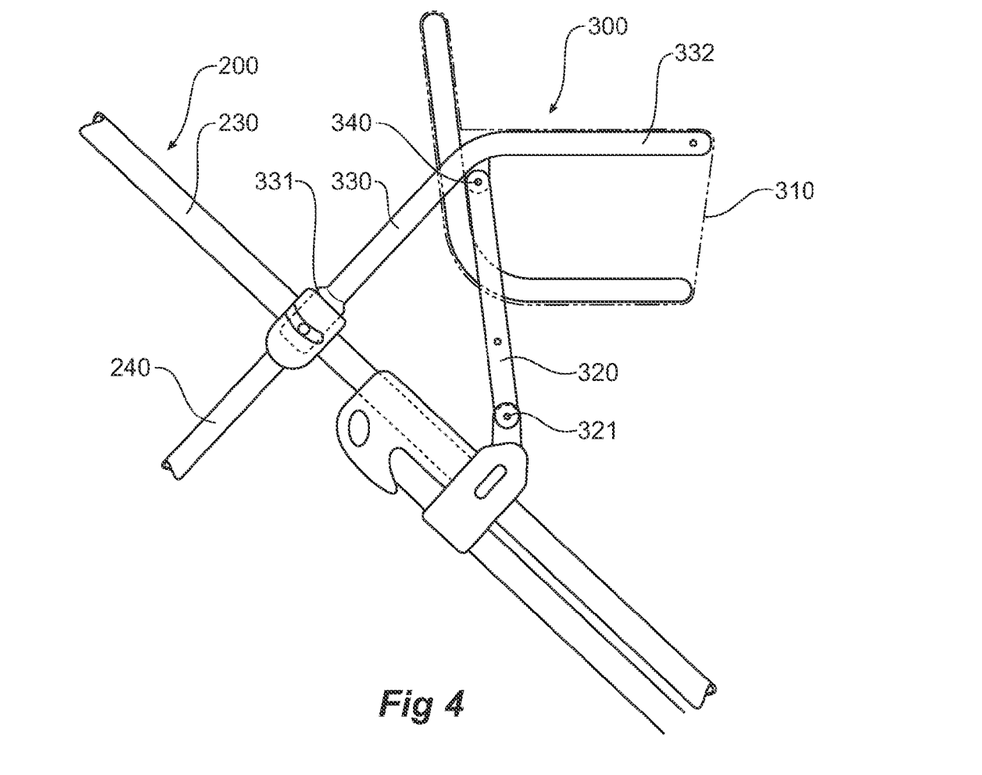
FIG. 4 is a side view of a mounting arrangement for a toddler seat as mounted to a stroller according to a second illustrative embodiment of the present invention.
Figure 4A:
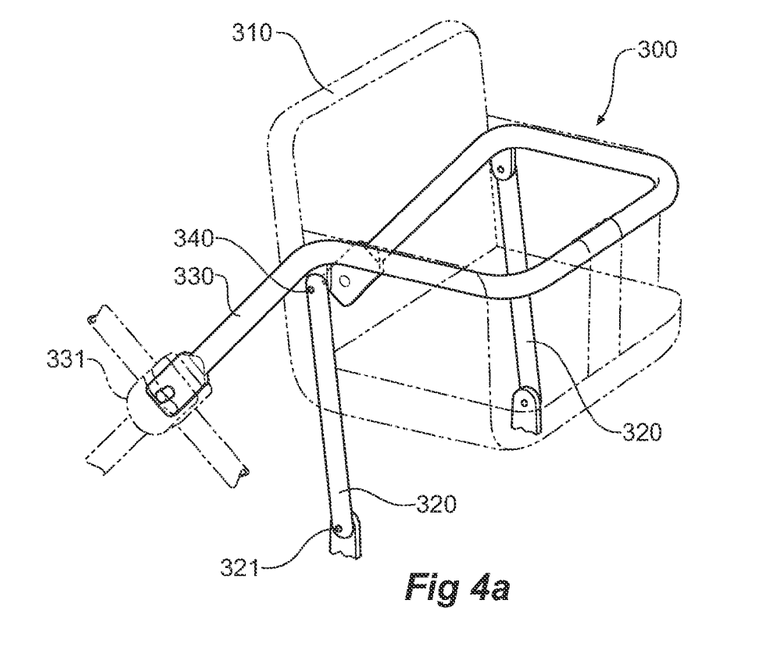
FIG. 4a is a detailed perspective view of the mounting arrangement as illustrated in FIG. 4.
Figure 5:
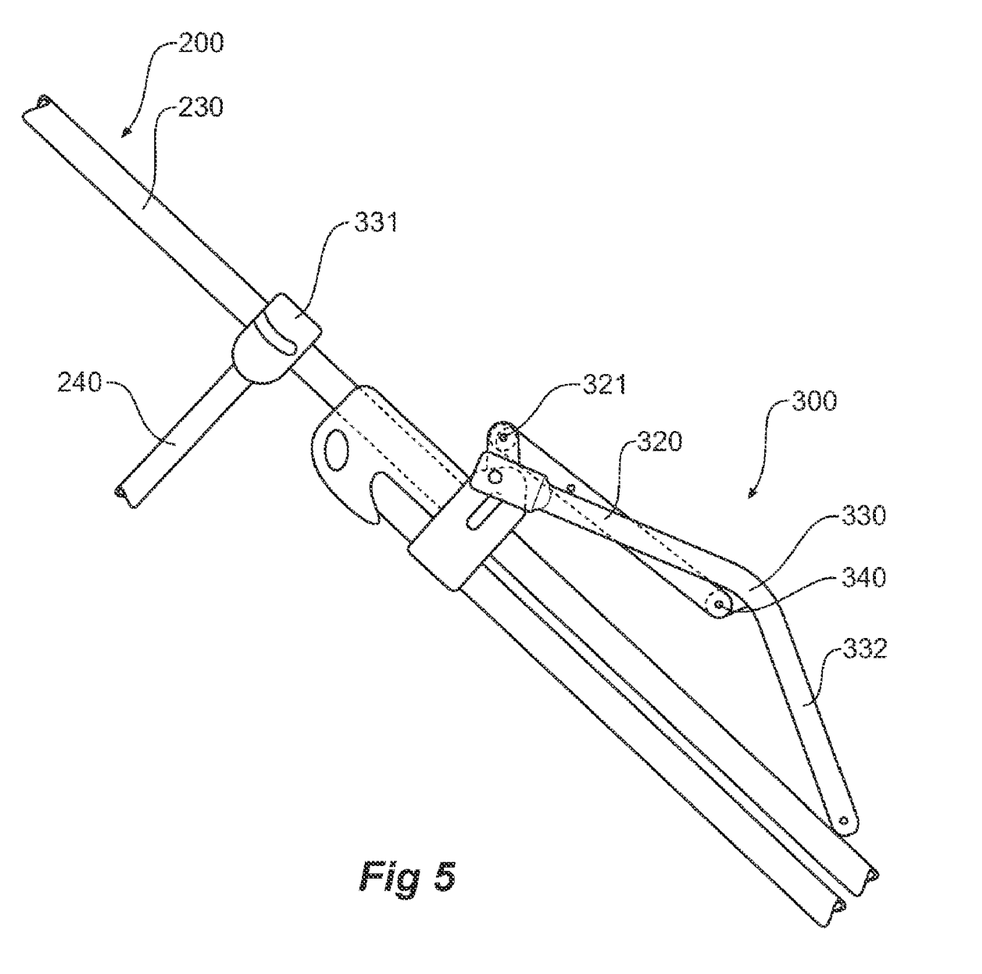
FIG. 5 is a side view of the mounting arrangement as illustrated in FIG. 4 in the compact folded position.

Referring now to FIGS. 4, 4a and 5, there is shown a mounting arrangement 300 for a toddler seat 310 according to a second embodiment of the present invention. In this second embodiment, first support element includes a pair of leg members 320 which are pivotably by hinge joints 321 attached to inclined frame sections 230 and further attached to second support element 330 by hinge joints 340 on respective sides of second support element 330. Second support element 330 is of one piece construction and extends over the stroller seat 260 and forms a mounting portion 332 for toddler seat 310. As best seen in FIG. 4a, toddler seat 310 is formed from a suitable fabric and is readily removable from mounting arrangement 300.

To fold mounting arrangement 300, second support member 330 is detached from respective inclined frame sections 230 by activating pin and slot release mechanism 331 as is known in the art and allowing the mounting arrangement 300 to collapse forward by virtue of hinge joints 321, 340 to a compact folded position.

Figure 6:
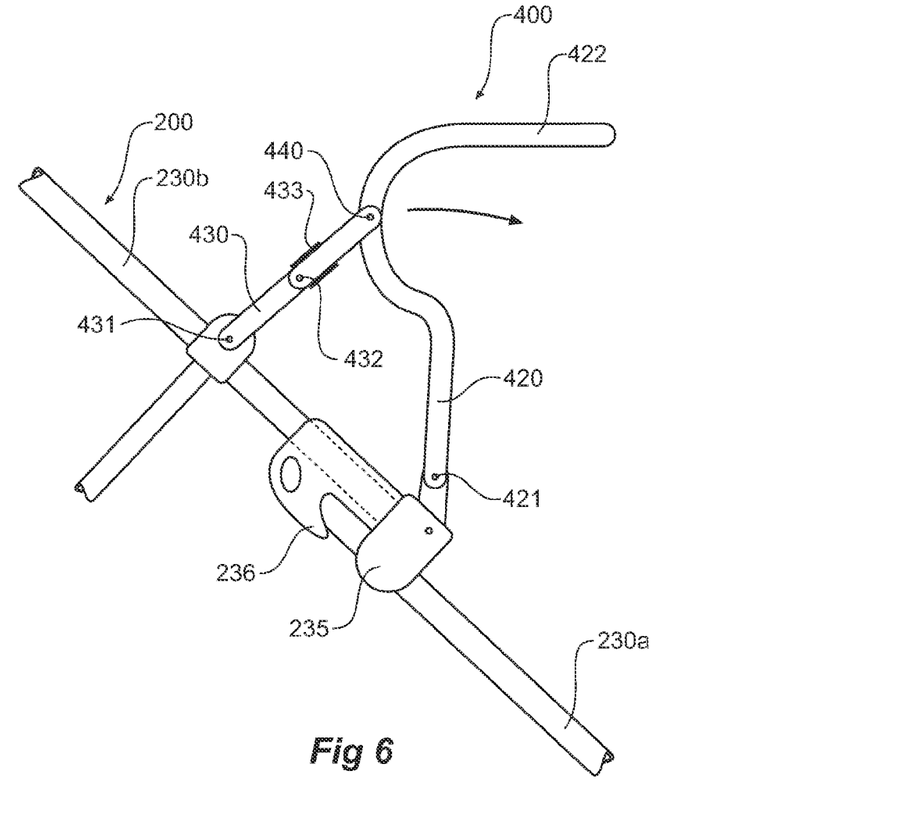
FIG. 6 is a side view of a mounting arrangement for a toddler seat as mounted to a stroller according to a third illustrative embodiment of the present invention.
Figure 7:
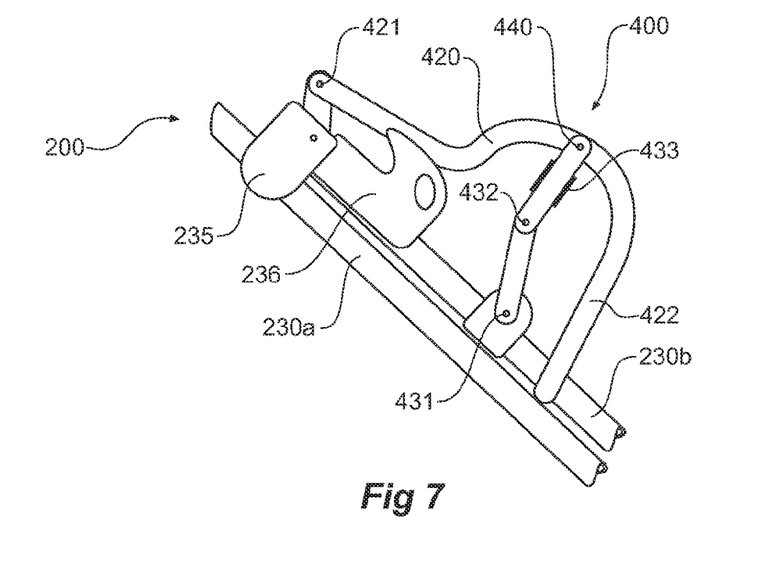
FIG. 7 is a side view of the mounting arrangement as illustrated in FIG. 6 in the compact folded position.

Referring now to FIGS. 6 and 7, there is shown a mounting arrangement 400 for a toddler seat (not shown) according to a third embodiment of the present invention. In this third embodiment, mounting arrangement 400 is mounted or attached to respective first and second frame elements 230a, 230b which make up each inclined frame section 230. First and second frame elements 230a, 230b are pivotably connected about hinge joint 235 as part of the folding mechanism for the stroller 200 which includes locking mechanism 236 as known in the art. Mounting arrangement 400 includes first support element 420 pivotably connected to first frame element 230a in a similar manner to that illustrated in the first embodiment (see FIGS. 1 to 3) including mounting portion 422 for a toddler seat (not shown).

Second support element consists of opposed leg members 430 which are pivotably connected to both second frame element 230b by hinge joint 431 and first support element by hinge joint 440. Each leg member 430 further includes an intermediate hinge joint 432 combined with a locking sleeve 433 slidable along said leg member to a locking position located about intermediate hinge joint 432. As would be appreciated by those skilled in the art, other locking means that are operable to restrain movement of intermediate hinge joint 432 are contemplated to be within the scope of the invention.

When folding stroller 200, locking sleeve 433 is removed from intermediate hinge joint 432, thereby allowing leg member 430 to fold about itself when folding second support element 230b onto first support element 230a (as best seen in FIG. 7). In this manner, it is not necessary to detach the second support element 430 from the stroller frame thereby further improving the convenience of the present invention.

Figure 8:
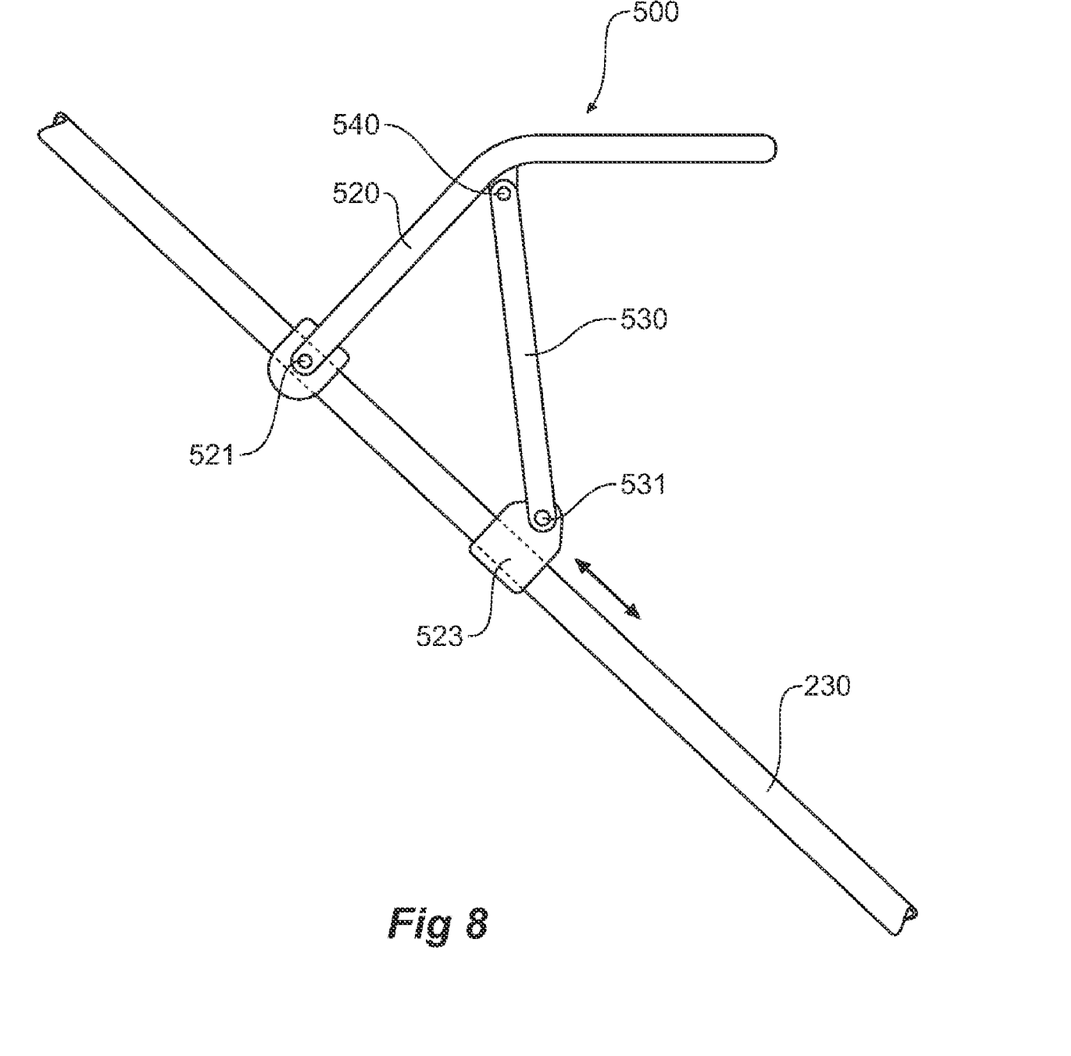
FIG. 8 is a side view of the mounting arrangement for a toddler seat as mounted to a stroller according to a fourth illustrative embodiment of the present invention.
Figure 9:
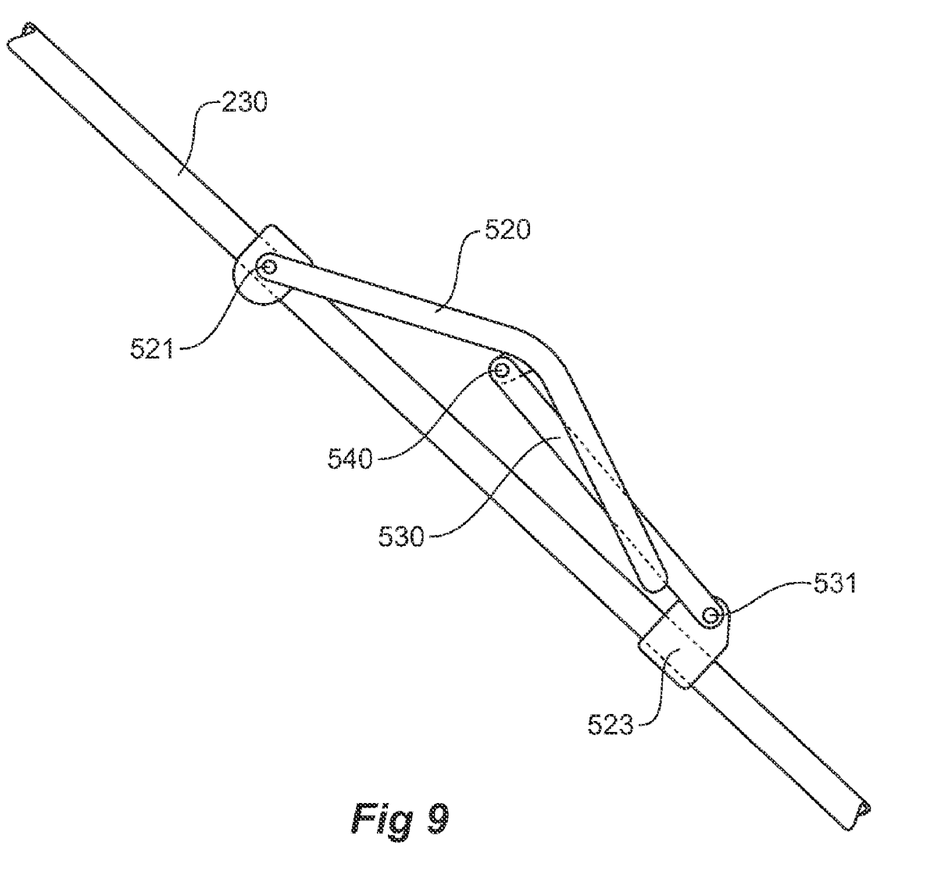
FIG. 9 is a side view of the mounting arrangement illustrated in FIG. 8 in the compact folded position.

Referring now to FIGS. 8 and 9, there is shown a mounting arrangement 500 for a toddler seat (not shown) according to a fourth embodiment of the present invention. In this fourth embodiment, the second support element includes leg members 530 each pivotably attached by hinge joint 531 to lockable collar 523 at one end and pivotably attached by hinge joint 540 to first support element 520 at the other end which itself is pivotably mounted to inclined frame section 230 by hinge joint 521. Lockable collar 523 may be released or disconnected from inclined frame section 230 to allow collar 523 slide down the frame resulting in mounting arrangement 500 collapsing downwards into a compact folded position.

As would be apparent to those skilled in the art, the scope of the invention includes all mechanisms which function to release the mounting arrangement from the stroller whether this be by complete detachment or by allowing support elements of the mounting arrangement to be able to move relative to the frame of the stroller.

Figure 10A:
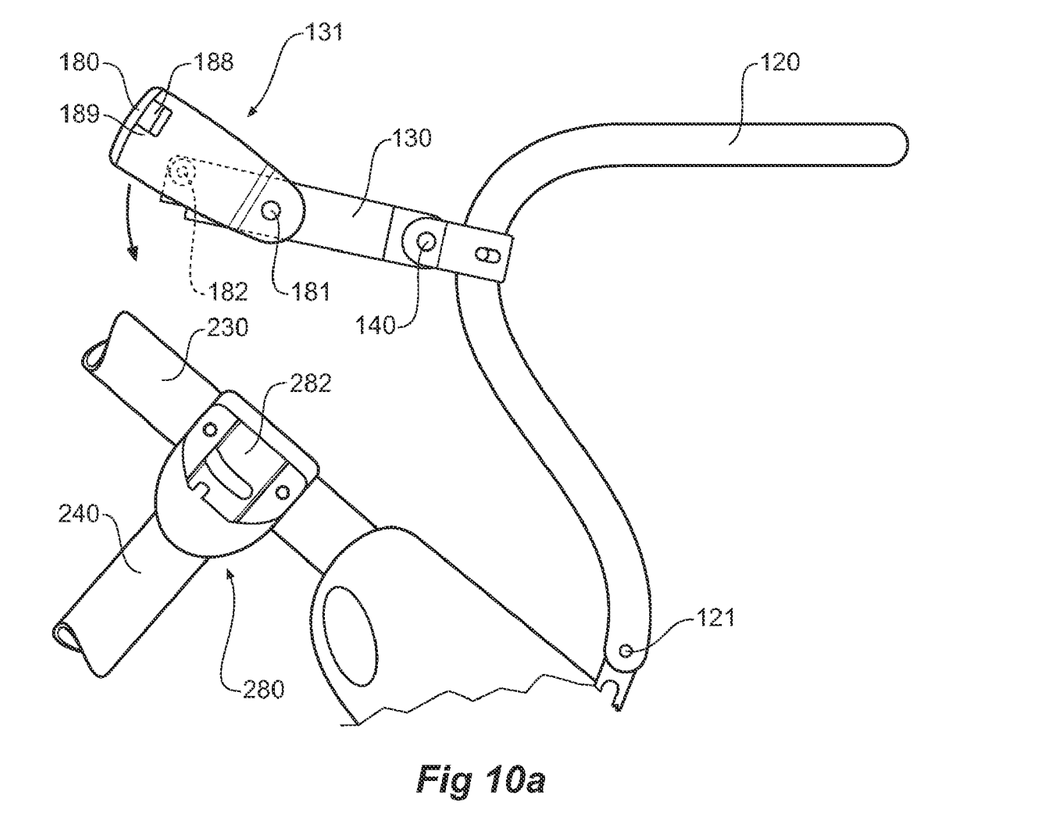
FIG. 10a is a detailed view of the release mechanism as employed in the mounting arrangement illustrated in FIGS. 1 to 5.
Figure 10B:
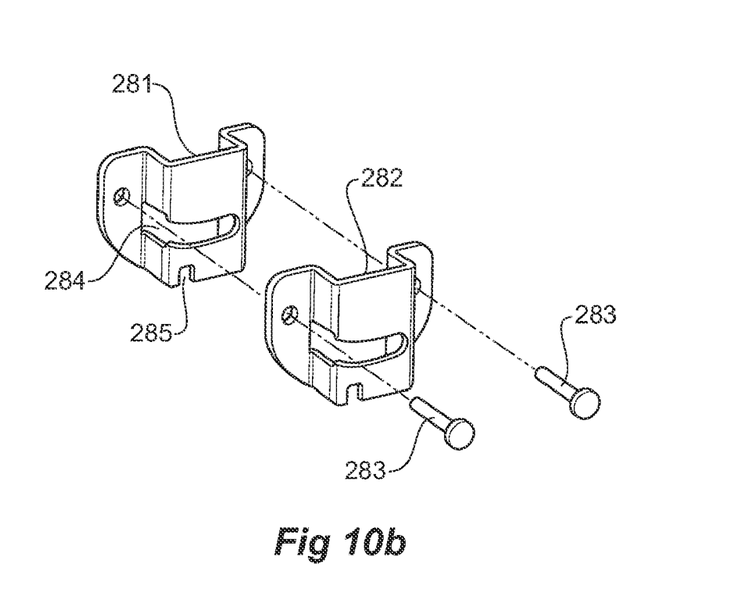

Referring now to FIGS. 10a and 10b and FIGS. 11a to 11e there are shown detailed views of the release mechanism 131 as depicted in FIGS. 1 to 3. Release mechanism 131 includes a pivotable latch 180 which engages with latching plate 280. Latching plate 280 includes pressed steel plate member 281 having a cut-away slot 284 and notch 285 and is covered by housing 282 having an identical slot and notch configuration (as best seen in FIG. 10b). Latching plate 280 is then retained in place to inclined frame section 230 by housing 284 and bolts 283.

Pivotable latch 180 is attached to leg member 130 by hinge joint 181. Latch 180 includes a base plate 180a incorporating a bolt 182 having a shaft and head which is received and retained within cut-away slot 284 located on latching plate 280. Base plate 180a also includes a slot 183 in which is received a spring-loaded carriage 186 by virtue of a dowel portion 187 which also serves to lock latch 180 to base plate by engaging in notch 285. Carriage 186 includes a flange 186b which includes aperture 186a which serves both as a mounting point for a spring 185 and as the actuating means for the carriage 186. Base plate 180 also includes an opposed spring mounting point 184 to attach the opposed end of spring 185 (see FIG. 11b).

Figure 11A:
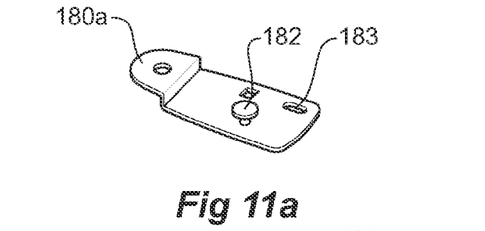
Figure 11B:
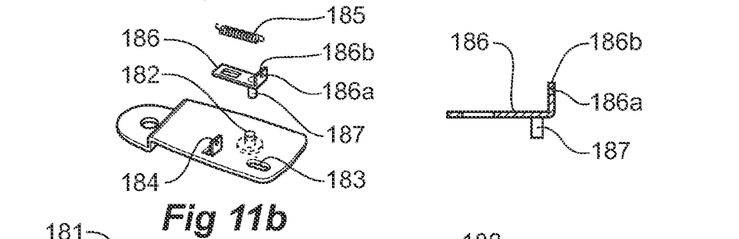
Figure 11C:
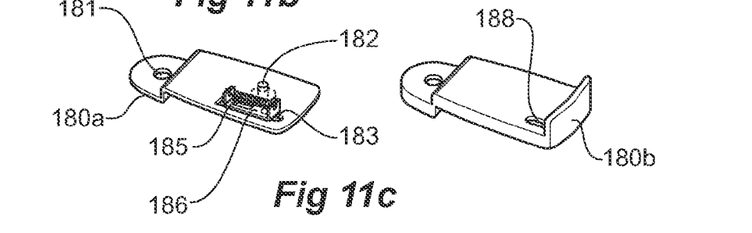
Figure 11D:
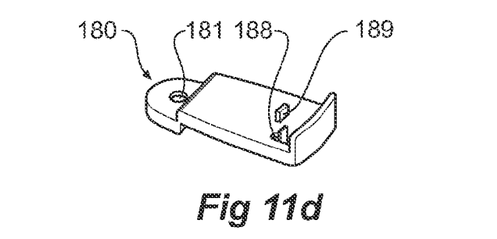
Figure 11E:
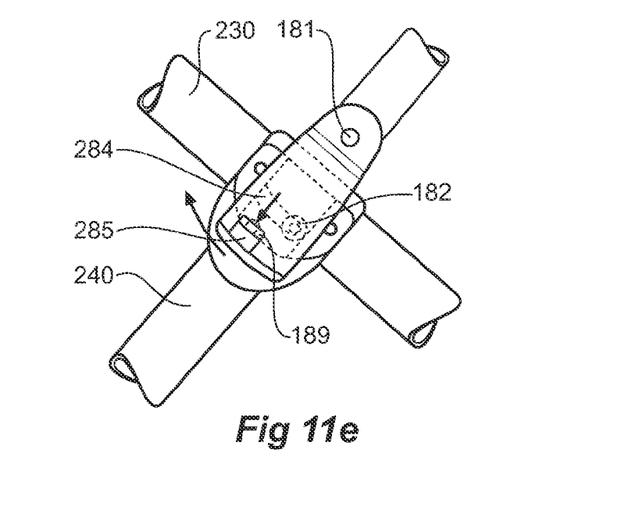

A cover 180b is press-fitted to base plate 180a to retain the spring loaded carriage 186 (see FIG. 11c). Cover 180b includes a slot 188 through which flange 186b protrudes. A manually operable actuator 189 is press-fitted onto flange 186 thereby forming a release mechanism for the latch 180 (see FIG. 11d).

To operate release mechanism 131, the actuator 189 is moved downwards as shown (see FIG. 11e) thereby freeing dowel 187 from notch 285 located on latching plate 280. Latch 180 is then free to rotate out from latching plate 280 thereby releasing the leg member 130 from the inclined frame section 230.

A brief consideration of the above described embodiments will indicate that the invention provides an extremely simple mounting arrangement for a toddler seat to a stroller or pram which is effective to significantly improve the storage capability of the stroller or pram when the toddler seat is attached to the stroller or pram. Additionally, the present invention allows the toddler seat to be attached to the pram or stroller in a location that makes it easier for the occupant of the stroller to be seated comfortably.

Although a number of embodiments of the present invention have been described in the foregoing detailed description, it will be understood that the invention is not limited to the embodiments disclosed, but is capable of numerous rearrangements, modifications and substitutions without departing from the scope of the invention as set forth and defined by the following claims.

The invention claimed is:

1. A mounting arrangement for mounting a toddler seat to a pram or stroller having a framework, the mounting arrangement including:

a) a first support element pivotably attached to the framework;

b) a second support element connected to the first support element;

c) a mounting portion to attach the toddler seat to the pram or stroller, wherein the second support element in a first deployed configuration is attachable to the framework to configure the mounting arrangement for the seating of a toddler, and wherein the second support element is further releasable from the framework to allow the mounting arrangement in use to fold or collapse to a compact folded configuration by pivotal movement of the first support element with respect to the framework.

2. A mounting arrangement for a toddler seat as claimed in claim 1, wherein the second support element is pivotably connected to the first support element.

3. A mounting arrangement for a toddler seat as claimed in claim 1, wherein the second support element includes a releasable locking means to lock the support element in position with respect to the stroller framework.

4. A mounting arrangement for a toddler seat as claimed in claim 3, wherein the releasable locking means is adapted to allow the second support element to be completely detached from the framework.

5. A mounting arrangement as claimed in claim 1, wherein the first support element includes the mounting portion for the toddler seat.

6. A mounting arrangement as claimed in claim 5, wherein the first support element is of a one piece construction pivotably connected to a first location on the framework at one end and extending over a seating portion of the stroller to be pivotably connected at its other end to an opposed second location on the framework.

7. A mounting arrangement as claimed in claim 5, wherein the second support element includes first and second opposed leg members each pivotably connected to opposed sides of the first support element and each attachable to the framework at respective locations displaced from the first and second opposed locations on the framework.

8. A mounting arrangement as claimed in claim 1, wherein the second support element includes the mounting portion.

9. A mounting arrangement as claimed in claim 8, wherein the second support element is of a one piece construction connected to a first location on the framework at one end and extending over a seating portion of the stroller of a connection at its other end to an opposed second location on the framework.

10. A mounting arrangement as claimed in claim 9, wherein the first support element includes first and second opposed leg members, each pivotably connected to the second support element and further pivotably attached to the framework at respective locations displaced from the first and second opposed locations on the framework.

11. A mounting arrangement as claimed in claim 3, wherein the releasable locking means includes sliding means to allow an end of the second support element to slide along the framework.

12. A mounting arrangement as claimed in claim 11, wherein the framework is tubular and the sliding means is a collar to slide along the tubular framework.

13. A mounting arrangement as claimed in claim 1, wherein the first support element is further detachable from the framework.

* * * * *